Figure 1:
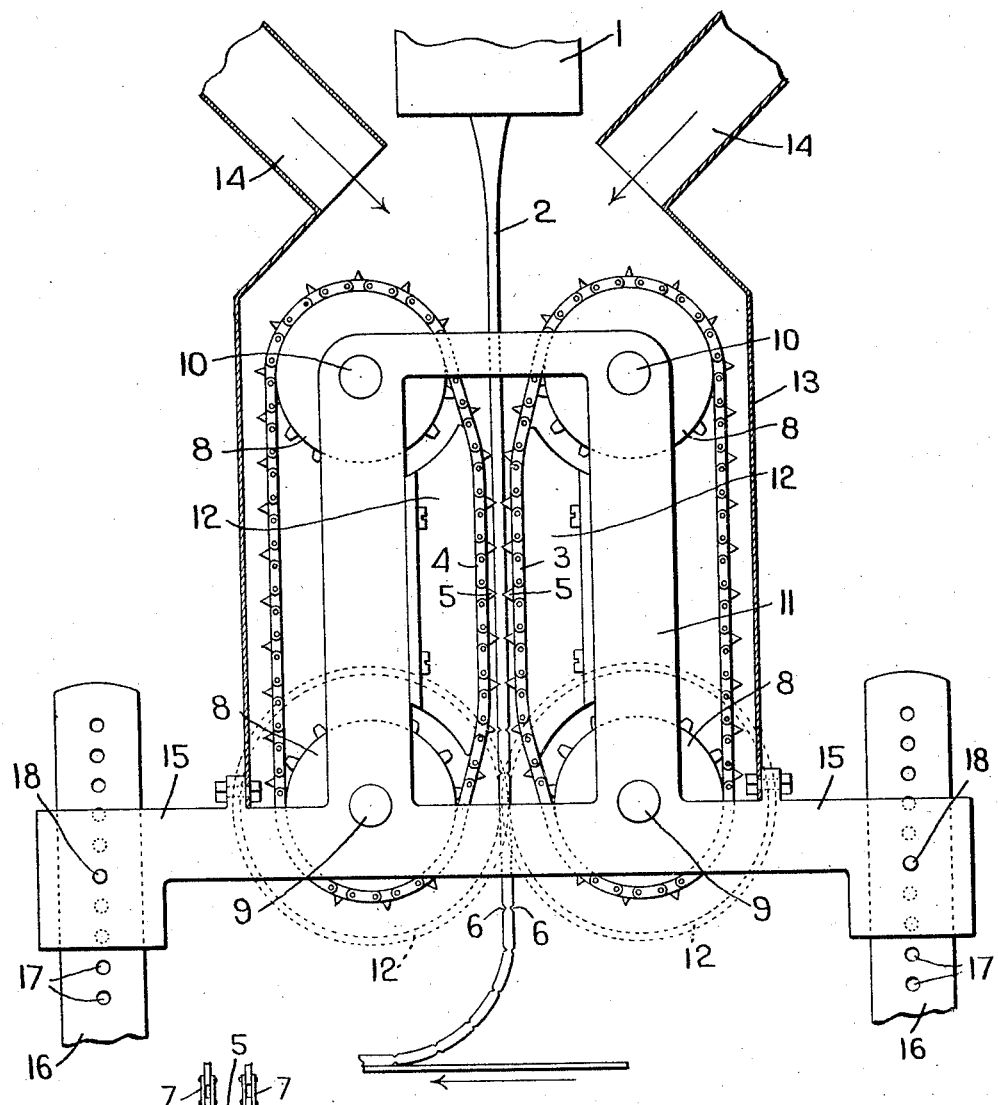

Feb. 9, 1926.

P. B. LASKEY

CANDY CUTTING MACHINE

Filed August 30, 1923

1,572,071

Inventor.
Philip B. Laskey
by Heard Smith & Tennant.
Attys.

Patented Feb. 9, 1926.

1,572,071

UNITED STATES PATENT OFFICE.

PHILIP B. LASKEY, OF MARBLEHEAD, MASSACHUSETTS, ASSIGNOR TO WILLIAM B. LASKEY, OF BROOKLYN, NEW YORK.

CANDY-CUTTING MACHINE.

Application filed August 30, 1923. Serial No. 660,243.

*To all whom it may concern:*

Be it known that I, PHILIP B. LASKEY, a citizen of the United States, and a resident of Marblehead, county of Essex, State of Massachusetts (whose post-office address is Marblehead, Massachusetts), have invented an Improvement in Candy-Cutting Machines, of which the following description, in connection with the accompanying drawing, is a specification, like characters on the drawing representing like parts.

This invention relates to a candy cutting machine of the type which is adapted to indent, at predetermined intervals, a strip of candy as it issues from an extruding machine, and while the candy is soft, so that after the strip cools, it can be readily broken into short sections at the indentations.

In the operation of candy cutters of this type, it has been found that if the candy is being delivered from the extruding machine at a relatively high speed, there is danger that the hot candy will heat the cutting elements to such an extent, that they will stick to the candy, in which case they do not properly perform their function.

It is the main object of the present invention to provide a novel candy cutting device, which is constructed so as to avoid this difficulty, and which can be used continuously without the cutting elements becoming heated to such an extent as to stick to the candy strip. This is accomplished by subjecting the cutting elements to the action of an air blast, which serves to keep them cool. In the preferred embodiment of my invention, the air blast is so arranged that it not only acts on cutting elements, but also acts on the candy strip just before the latter is subjected to the action of the cutter, and thus the surface of the candy strip is cooled as well as the cutter.

With this arrangement it is possible to operate the extruding machine and the cutter at a relatively high speed without danger that the cutter will become sufficiently heated to stick to the candy strip.

Another object of the invention is to provide an improved candy cutting device, which is adjustably mounted relative to the extruding machine, so that the cutting elements can be made to act on the candy strip at any desired distance from the extruding machine, depending on the character of the candy being made.

Still another part of the invention is to provide a candy cutting machine in which the cutting element functions not only to indent the candy strip as above described but also to pull or draw the candy thereby reducing its cross sectional area.

In the manufacture of some kinds of candy the candy material is extruded from the extruding machine in a strip which is much larger in cross sectional area than desired for the finished candy and this over sized strip is pulled to reduce its cross sectional dimension to the desired point. My improved machine is constructed so that this pulling of the candy is accomplished by the cutting element.

In order to give an understanding of my invention, I have illustrated herein a selected embodiment thereof, which will now be described, after which the novel features will be pointed out in the appended claims.

In the drawings, Figure 1 is a sectional view through a cutter illustration on my invention.

Figure 2:
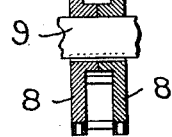

Fig. 2 is a section on the line 2—2, Fig. 1.

Inasmuch as the present invention relates to a cutting device adapted to act on a candy strip as it issues from the extruding machine, I have not thought it necessary to illustrate the extruding machine in detail. I have, however, indicated at 1 the die portion of an extruding machine from which a candy strip is being extruded.

The cutting device, which indents this candy strip at predetermined intervals, comprises two endless chain elements 3 and 4, which are situated on opposite sides of the candy strip 2, and are provided with blades 5 that act on the candy strip and form indentations 6 therein. Each endless chain element 3 comprises a pair of sprocket chains 7, which pass around sprocket wheels 8, each pair of sprocket chains being connected by the cutting blades 5. The sprocket wheels 8 are mounted on shafts 9 and 10, which are carried by a suitable frame 11 and the two shafts 9 are geared together by intermeshing gears 12, so as to compel them and the sprocket chains to rotate in unison. The sprocket chains may be driven positively by any suitable device (not shown).

The frame 11 is provided with two rests or supports 12, against which rest the portions of the sprocket chains that are acting on the candy strip. These rests or supports 12 serve to hold the active portion of the endless chain cutting elements in proper position to correctly perform their function.

When the candy strip 2 is being delivered from the extruding machine at a relatively rapid rate, the hot strip is apt to heat the cutting blades 5 to such an extent that they stick to the strip.

To avoid this, and to keep the cutting elements cool, I have provided a construction by which a blast of air may be delivered on to the cutting elements and also on to the candy strip.

In the present embodiment of my invention, this is provided for by enclosing the cutter in a casing 13, which is provided with two inlet pipes or passages 14, through which a blast of air may be delivered, as indicated by the arrows. These inlet pipes 14 are illustrated as being situated at an angle to the candy strip, there being one inlet pipe each side of the strip. As a result the air blast delivered through each pipe 14 impinges on the candy strip in advance of the cutting element, and also impinges on the blades 5 before they act on said candy strip. This air blast serves to cool the surface of the candy strip and also to cool the blades 5 sufficiently so that they will not stick to the candy. With this cooling arrangement, it is possible to operate the extruding machine at a relatively high speed without any danger that the candy will stick to the cutting elements.

In the construction shown, the cutting device is encased in an air blast, but this construction is a preferable one only, and may be modified in various ways without departing from the invention.

In making different kinds of candy, it is frequently desirable to have the cutting element act on the candy at different distances from the extruding machine and to provide for this, I propose to mount the cutting device so that it can be adjusted toward and from the extruding machine. This enables me to place the cutting blades nearer to or further from the extruding machine, depending on the character of candy being made.

While this adjustment may be secured in various ways, I have illustrated herein a simple construction in which the frame 11 is provided with two supporting arms 15, which are adjustably carried on two supporting posts 16. The posts 16 are shown as having a plurality of apertures 17 and the frame 11 is retained in its adjusted position by means of two pins or bolts 18, that are carried by the arms 15 and are adapted to be received in any one of the apertures 17.

If the candy strip 2 which is being extruded is of such a character that it does not need to be pulled, then the speed of travel of the cutting elements 5 will be the same as the speed at which the candy strip 2 is being extruded from the machine 1.

If however the candy material is of that character that requires to be pulled then the die 1 will be formed so that the candy strip which issues therefrom will be considerably larger than that desired for the completed strip and said strip will be pulled between the extruding machine 1 and the cutting elements to reduce it to the desired dimensions.

My invention contemplates performing this candy pulling operation by means of the cutting elements 5. If these cutting elements are placed at the proper distance from the extruding machine and are moved considerably faster than the candy material is extruded from the member 1, said elements will by their movement operate to pull the candy as well as to indent it.

The adjustability of the casing 13 with the candy cutting elements provides for placing the cutting elements at the proper distance from the extruding machine so that they may perform properly their candy pulling function.

It will be noted that with this form of candy cutting machine several cutters 5 will be acting simultaneously on the strip and this is important as it allows the cutting elements to perform the candy pulling operation without danger of pulling the candy apart.

With this invention therefore the endless chains 4 and the cutting elements 5 comprise a candy cutting and candy pulling device.

While I have illustrated herein one embodiment of my invention I do not wish to be limited to the constructional details shown.

I claim:

1. The combination with a candy extruding machine, of a cutting device to indent the candy strip at predetermined intervals as it issues from the extruding machine and means to subject the cutting device to a cooling air blast.

2. The combination with a candy extruding machine, of a cutting device to indent the candy strip at predetermined intervals as it issues from the extruding machine, and means to deliver an air blast on to the cutting device and also on to the candy strip before it is acted upon by said cutting device.

3. The combination with a candy extruding machine, of a cutting device to indent the candy strip at predetermined intervals as it issues from the extruding machine, a casing enclosing the cutting device and means to deliver an air blast into the casing.

4. The combination with a candy extruding machine, of a cutting device to indent the candy strip at predetermined intervals as it issues from the extruding machine, and means for cooling the cutting device.

5. The combination with a candy extruding machine, of a cutting device to indent the candy strip at predetermined intervals as it issues from the extruding machine, said cutting device being adjustable toward and from the extruding machine.

6. The combination with a candy extruding machine, of a combined candy cutting and candy pulling device operating on the strip of extruded candy and acting both to pull the strip longitudinally thereby reducing its cross sectional area and to indent the strip at predetermined intervals and means to cool the cutting and pulling device.

In testimony whereof, I have signed my name to this specification.

PHILIP B. LASKEY.